Figure 8:
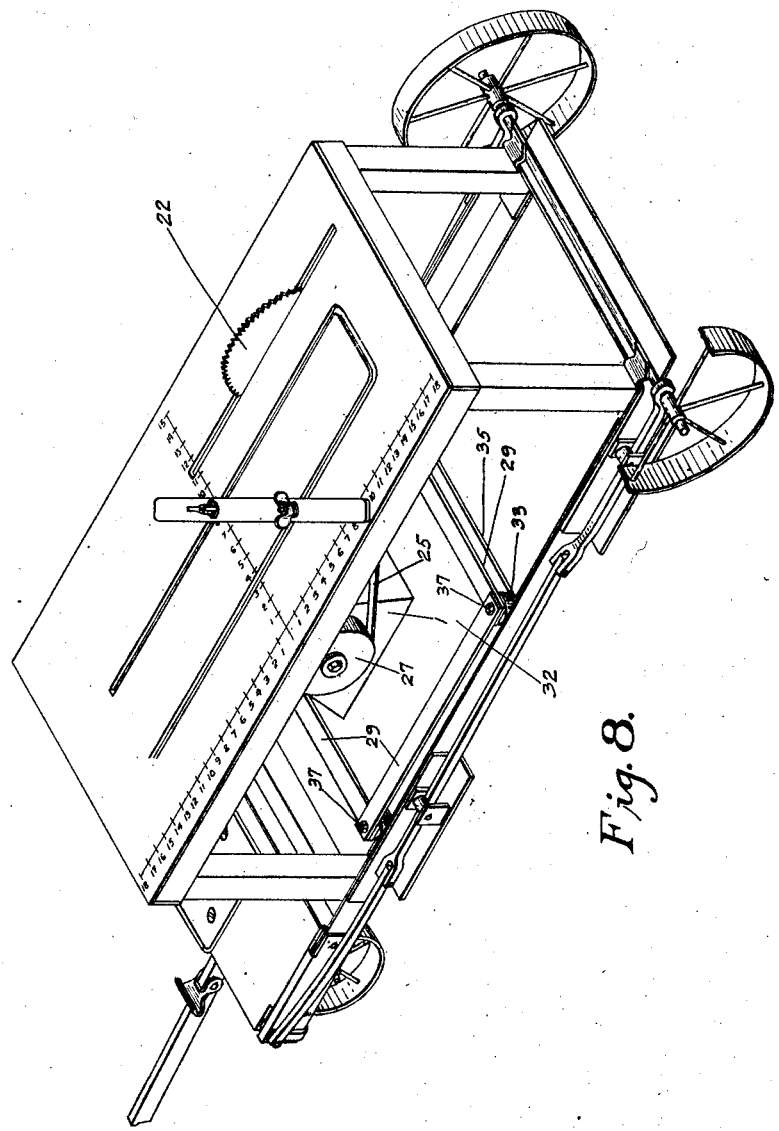

March 8, 1927.
N. MADDOX
1,620,370
ADJUSTABLE SAWING MACHINE
Filed April 28, 1924
3 Sheets-Sheet 1
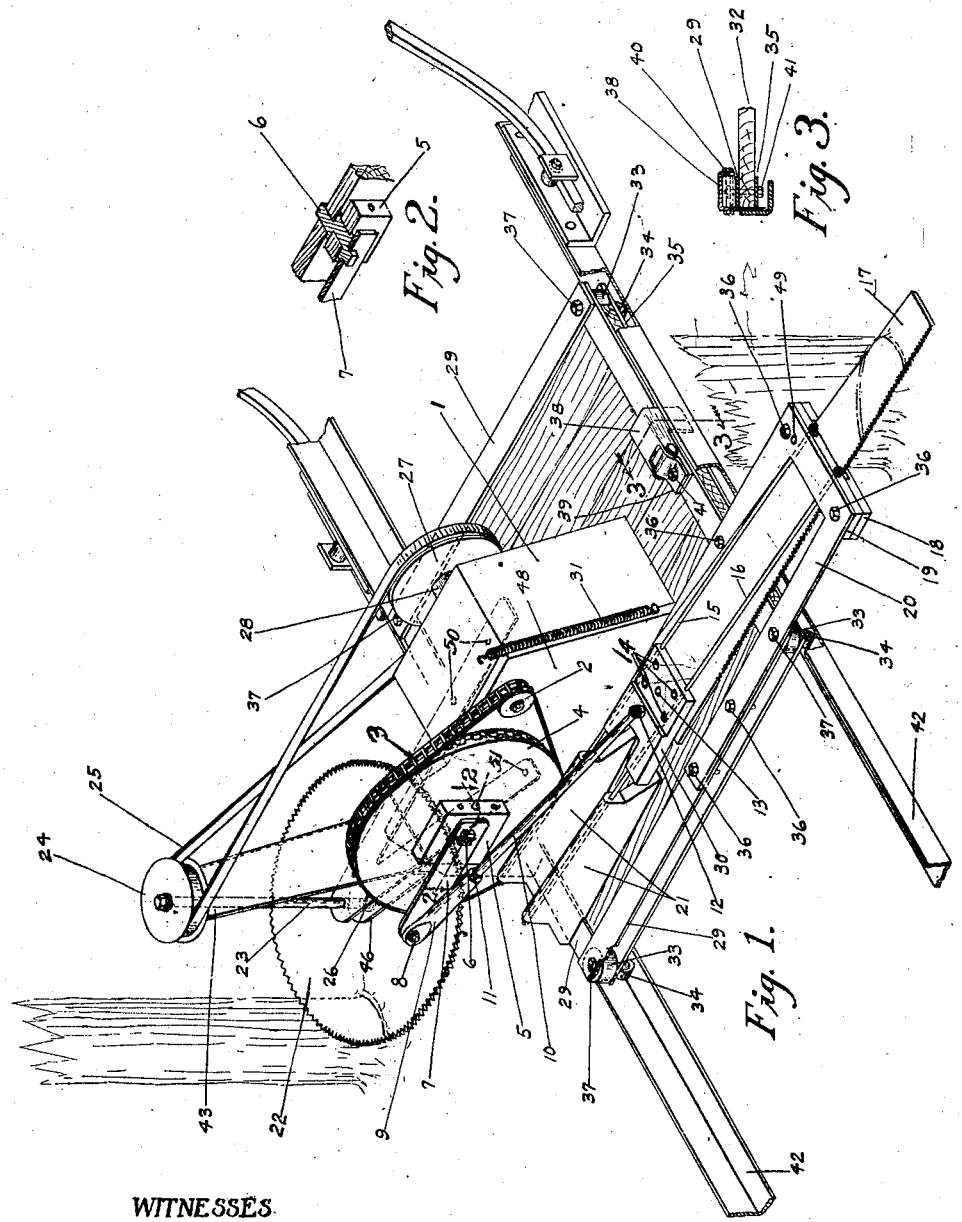
WITNESSES
INVENTOR
Notley Maddox March 8, 1927.
N. MADDOX
ADJUSTABLE SAWING MACHINE
Filed April 28, 1924    3 Sheets-Sheet 2
1,620,370
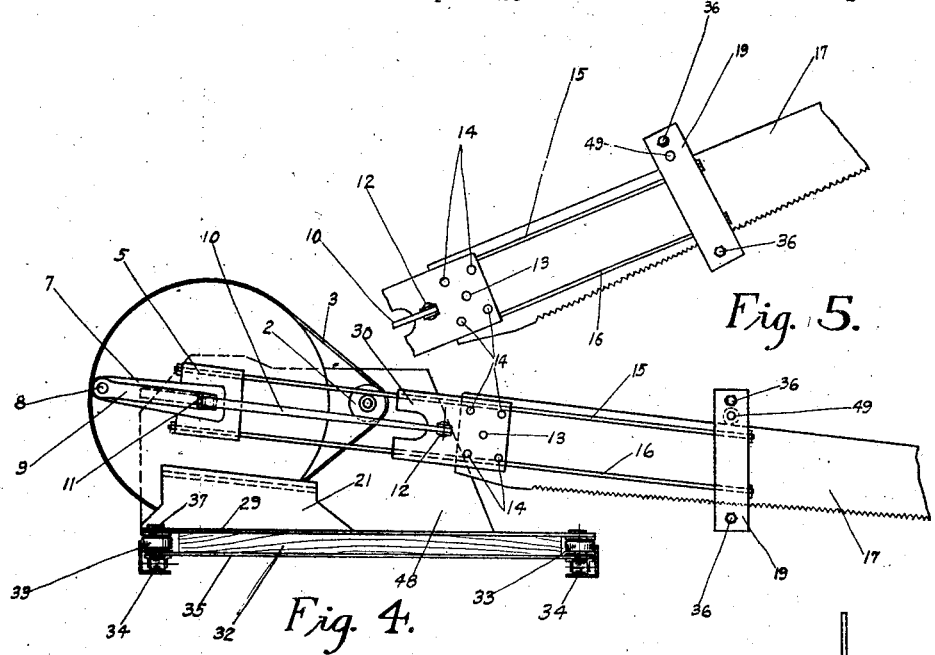
Fig. 5.
Fig. 4.
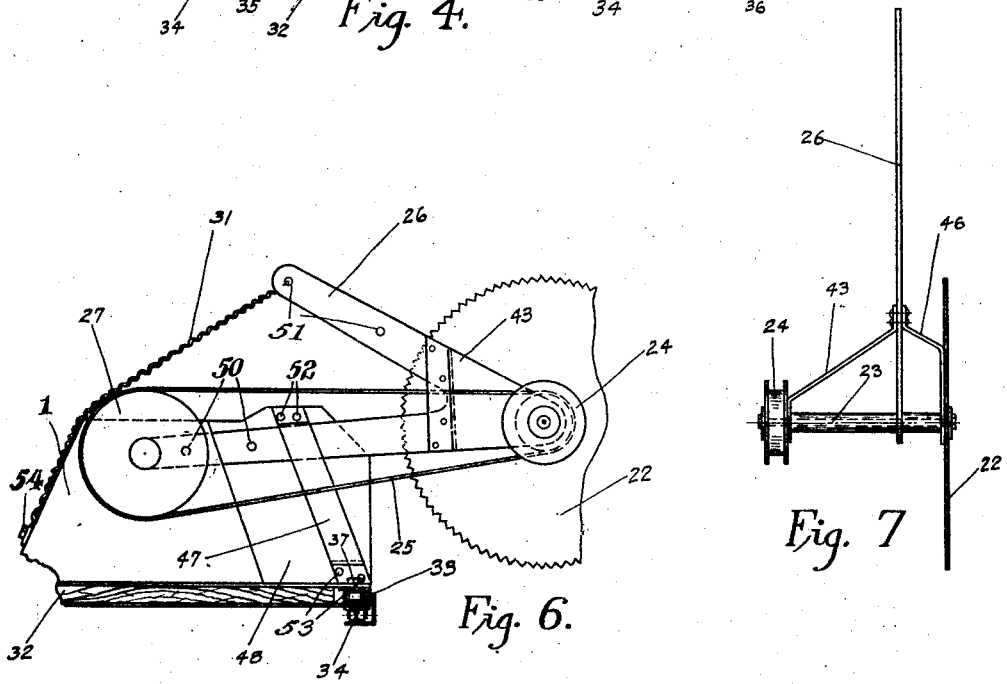
Fig. 6.
Fig. 7.
WITNESSES
INVENTOR
Notley Maddox March 8, 1927.

N. MADDOX 1,620,370

ADJUSTABLE SAWING MACHINE

Filed April 28, 1924     3 Sheets-Sheet 3

WITNESSES

INVENTOR.

Patented Mar. 8, 1927.

1,620,370

UNITED STATES PATENT OFFICE.

NOTLEY MADDOX, OF LOS ANGELES, CALIFORNIA.

ADJUSTABLE SAWING MACHINE.

Application filed April 28, 1924. Serial No. 709,587.

My invention relates to improvements in adjustable sawing machines in which a horizontal rotating circular saw operates in conjunction with a horizontal reciprocating cross cut saw or each may be made to operate in either vertical or horizontal position independent of the other.

The principal object to be attained by the use of this device is the clearing of timber lands smooth with the ground by means of two saws, both of which can be operated at the same time, the cross cut saw being used in the sawing of large trees and the circular saw for under-brush and trees of less diameter, it being easily adjusted and readily adapted for cutting this class of timber. After a cut has been made on one side of say to a depth of ten inches it can be quickly turned around and the remaining cut made on the opposite side, since great difficulty is experienced in cutting down trees less than twelve inches in diameter with saws of this character.

Secondly since this machine is not attached to the tree while it is being sawed down, it affords means for quick escape after the tree begins to fall without danger to the machine or individual operating it, in case the tree should bounce or kick over on the machine or danger encountered from falling branches.

Furthermore the saws are quickly changed to cut blocks or timbers of any desired length, it being constructed to saw three eighteen inch blocks with only two adjustments of the sliding table, without moving the truck upon which the device is made portable.

By this arrangement it is possible to accomplish a two fold purpose, that of sawing limbs and small branches with the circular saw, while the body of the tree is having a cut made with the cross cut saw.

It is also a convenient device for cutting heavy dimension timbers and bridge timbers since it can be adjusted at any angle thereby eliminating the moving of timbers from their useful positions.

It is applicable for cutting small timbers or dimension lumber for buildings by applying a table with legs bolted at each four corners of the angle irons of the supporting truck and operating the saw by foot control. Upon the surface of the table is a gauge whereby any cutting angle can be accomplished.

The machine being portable, it being constructed on a special truck is very easily moved around to localities where instruments of this nature are to be used and therefore eliminates considerable handling of the materials in question.

It is adaptable for cutting ice by turning the sliding table through an angle of 90 degrees, the cross cut saw will operate from the back and the circular saw will likewise function between the angle irons of truck frame, thus producing a tandem cutting arrangement, the circular saw making the initial cut and the cross cut saw following in the same cut and completing the operation to any desired thickness.

The construction, arrangement and operation of the parts of my machine will more fully appear in the following specifications, reference being had to the accompanying drawings in which—

Fig. 1 is a detail perspective view of the embodiment of my invention showing both saws in a horizontal position. Fig. 2 is a section through bearing on line 2—2 of Fig. 1. Fig. 3 is a section through clamping device on line 3—3 of Fig. 1. Fig. 4 is a side elevation of cross cut saw in vertical position. Fig. 5 is a side elevation of cross cut saw showing the different positions of operation in the same plane. Fig. 6 is a side elevation of circular saw in vertical position. Fig. 7 is a plan view of circular saw shown in Fig. 6. Fig. 8 is a perspective view showing one application of the cutting table and truck used in conjunction with the circular saw shown in Fig. 6.

Similar numbers of reference indicate corresponding parts throughout the several figures.

Referring now more in detail to the drawings:—1 indicates the engine of any preferred make which while operating furnishes the power for operating both saws through a system of sprockets, pulleys, chain and belt drives, the take-off from the engine shaft 28 which operates the cross cut saw being a power sprocket 2 connected by a chain belt 3 to sprocket 4 which is mounted on a square shaft 6 engaging a power arm 7 and linked to hollow end of pitman rod 9 by pitman bolt 8. The hollow portion of pitman rod 9 is made detachable, it being threaded to receive a threaded portion of the extensible rod 10 with a lock nut and washer 11.

The extensible rod 10 is attached to the slide 30 by a ball and socket joint 12, the reciprocating motion obtained by rotating of the power arm 7 about its axis 6 produces the cutting stroke of the cross cut saw 17 which is attached to the slide 30 by lugs 14 and bolt 13 and held securely in place by guide rods 15 and 16 which carry the saw.

The extruding portion of the saw 17 which performs the cutting, operates through guides 18 and 19 and by roller 49 held in position and fastened to the guide frame 20 by bolts 36. The guide rods 15 and 16 are fastened securely at both ends by engaging nuts to the guides 18 and 19 and base 21 respectively.

The saw and guide frame 20 is mounted upon a sliding table having an iron frame 29 upper and 35 lower with wood platform 32 between which is adjustable upon a truck frame 42 by rollers 34 held by bolt 37. Interposed between upper and lower iron frames is an intermediate roller 33 to relieve the pressure on the sides of angle iron frame 42 of truck.

The sliding table 29 is held in different positions on the truck frame 42 by a clamping device, Fig. 3, consisting of a wedge 38 which is pivoted to a clamp 39 by means of bolt 40, the entire clamping device being fastened to sliding carriage by bolt 41.

The take-off from the engine shaft 28 which operates the circular saw 22 in a horizontal position is an engine pulley 27 connected to saw pulley 24 and belt 25. The saw pulley 24 is mounted upon a shaft 23 and held in a horizontal position by main saw support 26, fastened to sliding table by bolts 50 and 51, which in turn is held in rigid position by additional braces 43 and 46.

Fig. 4 and Fig. 5 show different positions in which the cross cut saw can be placed while operating in the same plane in its vertical position. It will be noted that in these positions while the operation of the saw is the same, a different arrangement of the guide rods 15 and 16 supporting the slide 30 is necessary. To accomplish the desired result in this position the guide rods 15 and 16 are placed in anchor support 5 mounted on axle 6, the axle upon which the anchor 5 is mounted being a crank arrangement shown in Fig. 2, thus giving a rocking movement to the saw while making the cut. Likewise in Fig. 6 is shown an arrangement of the circular saw in a vertical position. While operating in this position a tension spring 31 has its fixed end fastened to the engine frame 48 by a bolt 54, while the other end, which is free except when the circular saw is made to operate in a vertical plane, is adapted to engage the main saw support 26 at 51, so that when the saw is depressed in making a cut it swings about the axis of the engine shaft, through the limitations of the guide 47 fastened to the side of engine base by fastenings 52 and 53 and, as this depression is being made and the saw guided in its cutting path, the tension spring 31 is elongated and, after the completion of the cut desired, the lower portion of the main saw support is forced back to the top of guide 47 by the tension in the tension spring 31 fastened to the upper portion of the main saw support.

Holes 50 and 51 are used to bolt the main saw support 26 to the sliding table 29 when the circular saw is made to operate in a horizontal plane. Fig. 7 shows in plan the same arrangement of circular saw shown in Fig. 6.

In Fig. 8 is shown one of the many uses described to which the saw can be made use of in addition to that of sawing down trees. Over the sliding table is superimposed a table top mounted on four standards having a graduated scale for cutting pieces at angles for different mitered joints. The standards for the table top are made of a convenient length to allow for proper projection of the saw through the table top and the truck upon which the sliding table is mounted is also adjustable in raising and lowering the adjustable sawing machine and which is more fully described in a divisional application.

Having thus described the invention, what I claim is:

In an adjustable sawing machine the combination of a horizontally reciprocating saw in a horizontal plane, which is adjustable on a sliding table, the said sliding table having a free shifting movement upon a supporting guide frame and a wedge pivotally connected to the sliding table so that it may be forced between the table and guide frame to clamp the same in any desired position.

In witness whereof I affix my signature.

NOTLEY MADDOX.